June 30, 1970  R. G. ENGLUND ET AL  3,517,877

CONTROL DEVICE

Filed Feb. 5, 1969  11 Sheets-Sheet 1

United States Patent Office 3,517,877
Patented June 30, 1970

1

3,517,877
CONTROL DEVICE
Roland Gosta Englund, Stockholm, Mats Erik Mattsson, Sollentuna, and Claes-Goran Lindelow, Taby, Sweden, assignors to Svenska Dataregister AB, Solna, Sweden, a corporation of Sweden
Filed Feb. 5, 1969, Ser. No. 796,790
Int. Cl. G06c 25/00
U.S. Cl. 235—3                                              11 Claims

ABSTRACT OF THE DISCLOSURE

A control device for a cash register which requires actuation of keys before an audit strip can be used in a machine or removed therefrom. Actuation of the keys prints the number of the machine and the number of the audit strip on each audit strip.

BACKGROUND OF THE INVENTION

In the following description, the present invention will be described in conjunction with a cash register where the data record is an audit strip, on which information in the form of optically readable text is printed. It should be realized, however, that, although the following description describes an embodiment of the present invention where optical text is printed on an audit strip, the invention is not limited to this specific embodiment. It is likewise possible to use this invention in conjunction with a machine that registers information on a magnetic tape, punch tape or other kind of data record.

When data processing an audit strip that has been printed by a cash register it has been found suitable, and in most cases even necessary, to be able to identify the audit strip with the cash register that has printed it.

It has also been found suitable to provide every audit strip with a consecutive number, which has such a relation to the consecutive numbers of other audit strips printed by the machine, that one easily could check, that none of the audit strips that is to be data processed later, has been lost.

Previously known devices have not in a satisfactory way, or have not at all, been able to register information on the audit strip that identifies it with a certain cash register and that identifies it among a number of other audit strips printed by the same machine.

The device according to the present invention registers the above mentioned information on the audit strip and is constructed in such a way that the information is compulsorily registered both in the beginning and in the end of the audit strip.

This registering of information is achieved by a special key and a common total key being provided on the keyboard of the cash register. When a used up audit strip is to be taken out of the cash register, the special key must be depressed, thereby registering the above mentioned information on the audit strip, before the audit strip can be taken out of the machine. Consequently, it is impossible to take an audit strip out of a cash register at any occasion without registering the identity number of the cash register and the consecutive number on the audit strip. When a new audit strip has been put into the cash register the total key must be depressed, thereby registering the above mentioned information on the audit strip, before any other information can be registered on the audit strip. Thus, it is not possible to start the cash register after a new audit strip has been put in, unless the total key has been depressed, so that the identity number of the machine and the consecutive number have been printed on the audit strip.

The device according to the present invention also com-

2 prises means that prevent the cash register from being started if a locking device, surrounding the audit strip, has not been replaced and locked.

Furthermore, the device according to the present invention comprises means that prevent the cash register from being started if the audit strip has not been put in or has not been fed forward, which, for instance, could depend on the audit strip having been torn off.

SUMMARY OF THE INVENTION

A control device for a cash register which prevents an audit strip from being used in a machine or removed therefrom without printing the number of the machine and the number of the audit strip thereon.

DESCRIPTION OF THE PREFERRED EMBODIMENT

In those cases where devices, that have only peripheral connections with the present invention, have not been described in detail in the following description, we refer to the applicants' U.S. Pat. 3,263,915, which describes and shows these devices in full detail.

Figure 1:
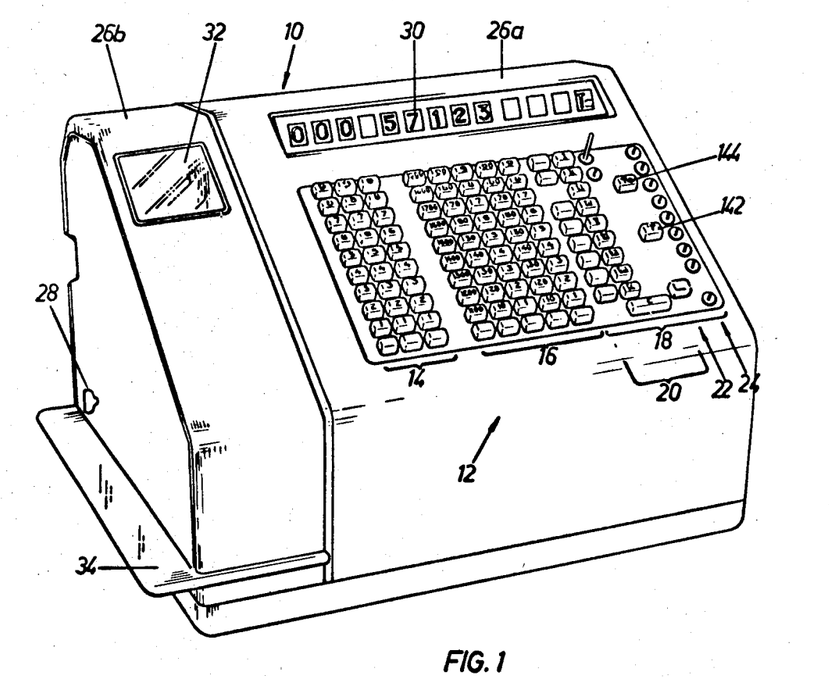
FIG. 1 is a perspective view of a cash register provided with the means according to the present invention.

The cash register 10, according to FIG. 1, which accommodates the devices according to the present invention, is provided with a keyboard 12. The keyboard 12 has a group 14 of print banks, a group 16 of amount banks and a group 18 of transaction banks. The transaction banks. consist of the selector banks 20, the operation bank 22 and the lock bank 24.

A cabinet 26a covers the body of the cash register and a cabinet 26b that covers the printing unit, is joined with the cabinet 26a by a locking device (not shown), being controlled by the button 28.

When the audit strip printer is engaged there is possibility for complete visual control of all the details of information in a certain transaction. The result of the latest performed transaction can be read on the indicating means 30, and the information that has been printed on the audit strip can be read in the window 32 in the cabinet 26b.

The printing unit also includes a slip printing mechanism, which is enclosed in the cabinet 26b. The slip table that belongs to this mechanism is situated immediately below the cabinet 26b in the bottom part of the cash register.

The devices according to the present invention include a register 100a (FIG. 5) which is pre-programmed, and shows a number (identity number) which is significant for the machine. Hence, this number belongs to only one of a number of machines that a shop, such as a larger department store, is provided with. This number will be compulsorily printed both in the end and in the beginning of the audit strip of the machine, so that the equipment, that later on will read and process this strip in order to receive statistics on selling etc., will know that the strip is derived from a specific machine. If a number of proprietors are having the audit strips from their cash registers processed by one common reading and data processing equipment, it would be necessary for this equipment to be able to relate and emit data, concerning one or several certain cash registers, to the right proprietor without making any error.

Figure 5:
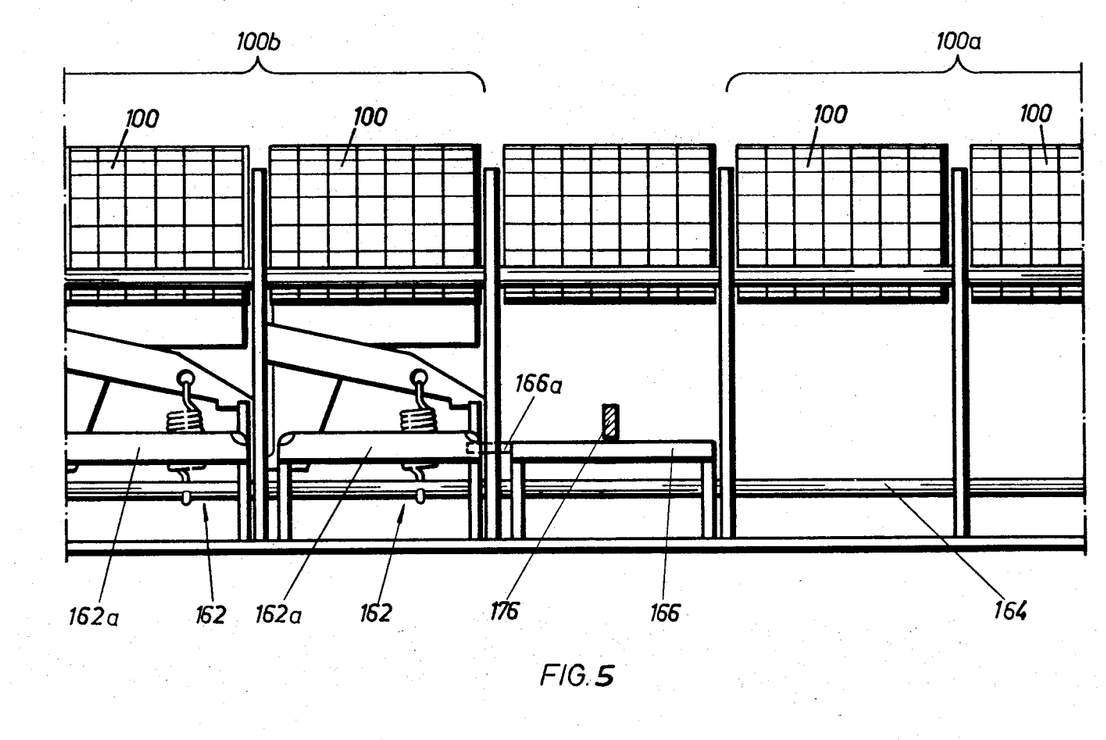
FIG. 5 is a schematic view of a register containing the identity number of the cash register arranged on the same shaft as the register that contains the consecutive number of the audit strip, and tens transfer mechanisms cooperating with these registers.

The register 100a which is supported by the shaft 102 is pre-programmed through its register gears 100, at a certain mode of operation, receives the identity number of the cash register by the rack assembly of the machine. This programming is better described in the applicants' patent application No. 558,758, now U.S. Pat. No. 3,366,- 323. The programming could also be performed already at the time of assembly by rotating the gears 100 in the register 100a to a position a distance away from the zero position, using a screw-driver or similar means, whereby the significant number of this certain cash register is received by the gears of the register 100. This number will remain in the register 100a until the register 100a is to be programmed with other information.

A counter register 100b is mounted on the same shaft as the pre-programmed register 100a. The purpose of the counter register 100b is to provide the audit strip of the cash register with a consecutive number, this consecutive number showing which number of audit strip it is, that receives imprints. The consecutive number is only printed on the beginning and on the end of the audit strip. When the pre-programmed register is to be read, the information in the counter register, together with the information in the pre-programmed register 100, will be compulsorily printed on the end of the audit strip. This is performed when an audit strip has received so many pieces of information that it must be taken out of the cash register. Then, when a new audit strip is installed in the cash register, the information in the pre-programmed register 100a, together with the information in the counter register 100b, is again compulsorily printed on this audit strip. The information of the counter register 100b, now printed on the new audit strip, is the same information that was printed on the end of the latest audit strip. When the new audit strip has received so many pieces of information that it must be taken out of the cash register, the information in the pre-programmed register 100a, together with the information in the counter register 100b, is compulsorily printed on it. The information in the counter register 100b, is now one unit larger than the information in the counter register 100b, which was printed on the beginning of the new audit strip. Consequently, every audit strip compulsorily receives an identity number and a consecutive number, on its beginning as well as on its end. If the consecutive number on the beginning of the audit strip is 27 the consecutive number on the end of the same audit strip must be 28, and the following audit strip also must have 28 in the beginning and 29 in the end. Naturally, the same consecutive number can be printed on the beginning as well as on the end of the audit strip. Consequently, the following audit strip will have a consecutive number one unit larger than the consecutive number on the preceding audit strip, printed on the beginning as well as on the end. It does not matter which one of these systems is chosen. The main thing is that the reading and data processing equipment can process the audit strips correctly. However, the following description relates to a device where the consecutive number printed on the end of the audit strip is one unit larger than the consecutive number printed on the beginning of the same audit strip.

FIG. 5 shows seven gears in each order of the cash register. However, only one gear 100, for example the third from the left in each order, is used in the present invention. In the following description it is assumed that the pre-programmed register 100a comprises three orders (only two are shown in FIG. 5) and the counter register 100b comprises two orders (see FIG. 1).

According to FIG. 5, the order positioned between the registers 100a and 100b, does not belong to any of these registers, and has nothing to do with the present invention.

Figure 3:
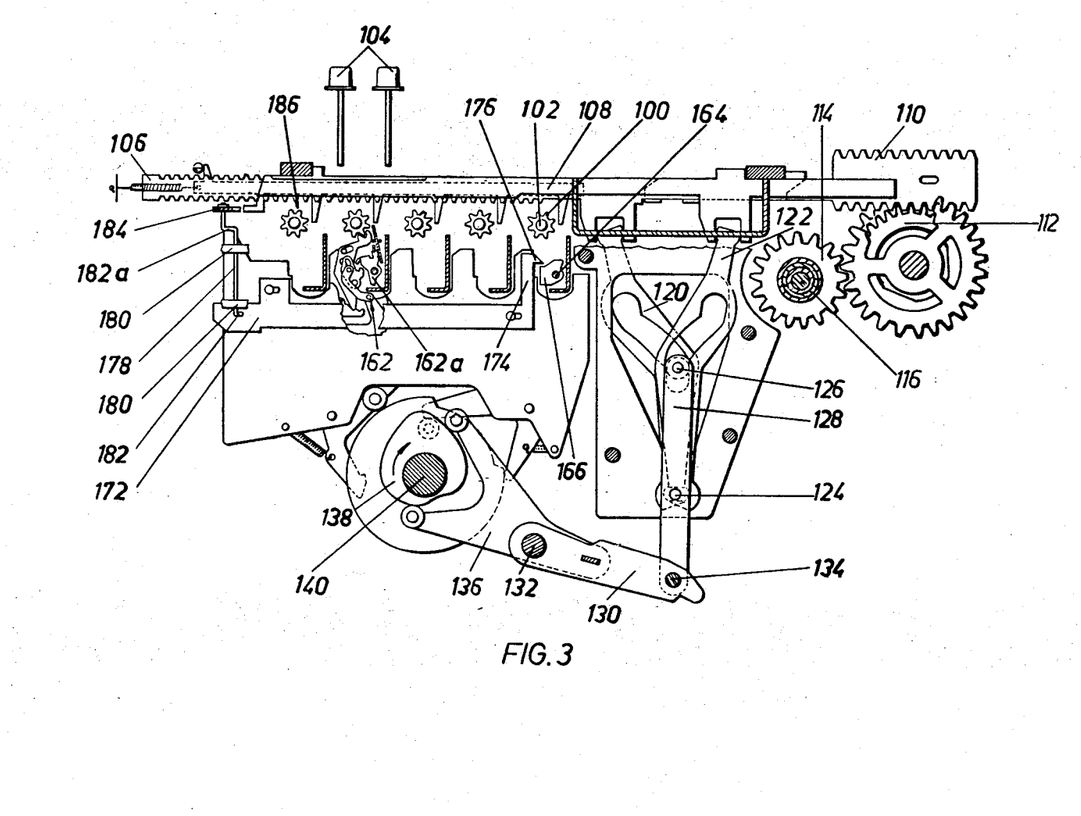
FIG. 3 is a side elevational view of a rack system in an amount bank, which rack system can be controlled by the keys that are schematically shown in FIG. 1 or by means that are controlled from the operation bank in FIG. 2.

The drive means for the registers 100a and 100b is composed of differential means which can be controlled by keys on the keyboard of the cash register, two, 104, of which are shown in FIG. 3. The differential means are also used to zeroize or read, respectively, the registers at certain modes of operation. The keys 104 are not depressed at these occasions. The differential means comprise one actuator rack 106 and one complementary slide 108, slidably mounted for movement parallel to each other. The edges of rack 106 and slide 108 are provided with lugs adapted to be moved into engagement with opposite sides of the stems of the depressed keys 104. The lower edge of the actuator rack 106 is provided with teeth, adapted to engage a register gear 100 when this is in raised position. Indicating and printing means are controlled by the actuator rack 106 and complementary slide 108 in dependence of the position to which they have been moved. Means for controlling the indicating and printing means comprises an indicator rack 110, slidably mounted between rack 106 and slide 108. Indicator rack 110 is loosely fitted to rack 106 and slide 108 by suitable lugs on rack 110 that engage shoulders or lugs on rack 106 and slide 108.

Figure 8:
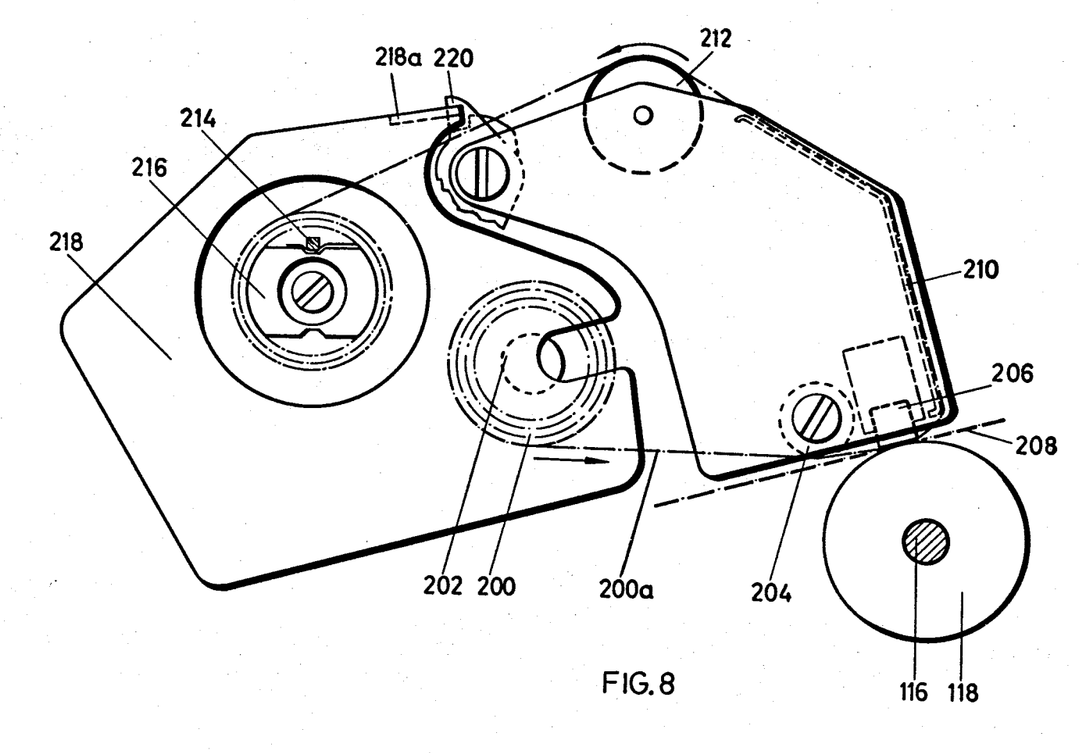
FIG. 8 is a schematic side elevational view of the audit strip and means for registering imprints on it, and part of a locking device, the function of which is to permit or to prevent, respectively, that a cover, which surrounds the audit strip, can be removed in certain modes of operation.

As mentioned above, indicating rack 110 controls the printing means which are set in accordance with the movement of the indicating rack 110, and which comprise one intermediate gear 112 that meshes with a gear 114, mounted on a telescopic shaft 116. On the other end of the shaft is mounted a type wheel 118 (FIG. 8). The type wheel 118 is adapted to make contact with the media being adapted for the printing, like a ticket, an audit strip and a sales slip. Each order is provided with one indicating rack 110, and the gears 114 and the type wheels 118, which belong to each order, are arranged on coaxial telescope shafts. For a more detailed description of the telescope shafts and the type wheels we refer to the applicants' U.S. Pat. No. 3,296,961.

In the following description, "forward" stroke in a reciprocatory cycle of operation designates the first stroke of the cycle regardless of the direction with respect to the machine.

In a registering cycle of operation, the actuator rack 106 is moved to the right in a "forward" stroke to a position where it is arrested by the stem of a depressed key 104, and the complementary slide 108 is moved to the left in a "forward" stroke to a position complementary to that of the actuator rack 106. During this movement, the lugs on the indicator rack 110, the rack 106 and the slide 108, respectively, work jointly to the effect that the rack 106 is moved from its previous position to a position corresponding to the present setting of the rack 106 and the slide 108. When the rack 106 and the slide 108 are restored to their normal positions, the indicator rack 110 will remain in the set position inasmuch as the rack 106 and the slide 108 move away from the lugs of the indicating rack 110.

Drive means for the differential assembly 106, 108, 110 of each order of a register unit includes a pair of vertically disposed arms 120, 122, connected at their upper ends to rack 106 and slide 108, respectively. Arms 120, 122 have common fixed pivotal mounting at their lower ends and each is provided with a cam slot. The two slots are engaged by a roller 126, mounted between the upper ends of a pertaining pair of links 128. When the links 128 are raised from normal position (FIG. 3) the upper ends of the arms 120, 122 will be moved towards one another, thereby moving rack 106 towards the right and slide 108 towards the left.

A drive unit for raising and lowering the links 128 includes a pair of pair of spaced arms 130 suitably tied together and pivotally mounted at one of their ends on a shaft 132. A shaft 134 extends between the other ends of the arms 130. The links 128 are pivotally mounted on the shaft 134. To simplify the drawings, only a single pair of links 128 for one of the differential assemblies is shown. A cam follower 136 is secured to one of the arms 130 and engages positive action cam means 138 including a pair of cams mounted on the main shaft 140. During a machine cycle, the cam means 138 renders the follower 136 a counterclockwise and return motion thereby raising and lowering the links 128.

The differential means in the operation bank, controlled by keys, like the keys 142 and 144, are substantially identical with previously described differential means, controlled by the keys 104. Therefore a further description should not be necessary. As the differential means in the operation bank do not engage the registers 100a and 100b, the lower edges of these differential means are not provided with teeth. The indicating rack 110a rotates the type wheel for mode of operation in the same way as has been described in connection with the indicating rack 110 in FIG. 3. The left end of the indicating rack 110a is fitted to a mode of operation slide 146, the setting of which is made in correspondence with the indicating rack 110a.

The mode of operation slide 146 is provided with a longitudinal series of spaced apertures 146a which are in effect drive teeth which affect a gear 148, affixed to a vertically positioned shaft 150, which is rotatably mounted in bearings 152. A cam disc 154 is also affixed to the shaft 150. The apertures 146a and a second series of apertures control means for determining the times during an operating cycle at which certain operations are to be performed, such as to raise and lower the registers 100a and 100b into and out of engagement with the actuator rack 106.

The drive means for the differential means 106a, 108a, 110a in the operation bank comprises a pair of arms 120 and 122, a pair of links 128 and a drive unit 156 including a cam follower which co-operates with a pair of cams 158, 160 on the main shaft 140. These units operate the differential means in the operation bank in substantially the same way as the differential means for the registers 100a and 100b, and therefore, a further description should not be necessary. The timing, however, is different because the mode of operation must be selected before the differential means for the registers 100a, 100b can be allowed to operate.

The tens transfer means designed to register a unit in each higher order register gear in response to movement of the next lower order gear from "9" to "0" has been modified in operation with respect to the lowest, or units, order of the counter register 100b.

Each tens transfer unit 162 includes a bracket 162a (FIGS. 3, 5, 6, 7) pivotally mounted on a common shaft 164. With reference to FIG. 5, there is a transfer unit for each order of the counter register 100b, but none for the pre-programmed register 100a wherein a tens transfer operation never is indicated. Moreover, there is no tens transfer mechanism for the intermediate order between registers 100a, 100b. In this order, however, there is a bracket 166, rockably mounted on shaft 164. From the above, it will be seen that the register gears in the intermediate order between the registers 100a, 100b have no function and could be removed from the cash register.

Figure 6:
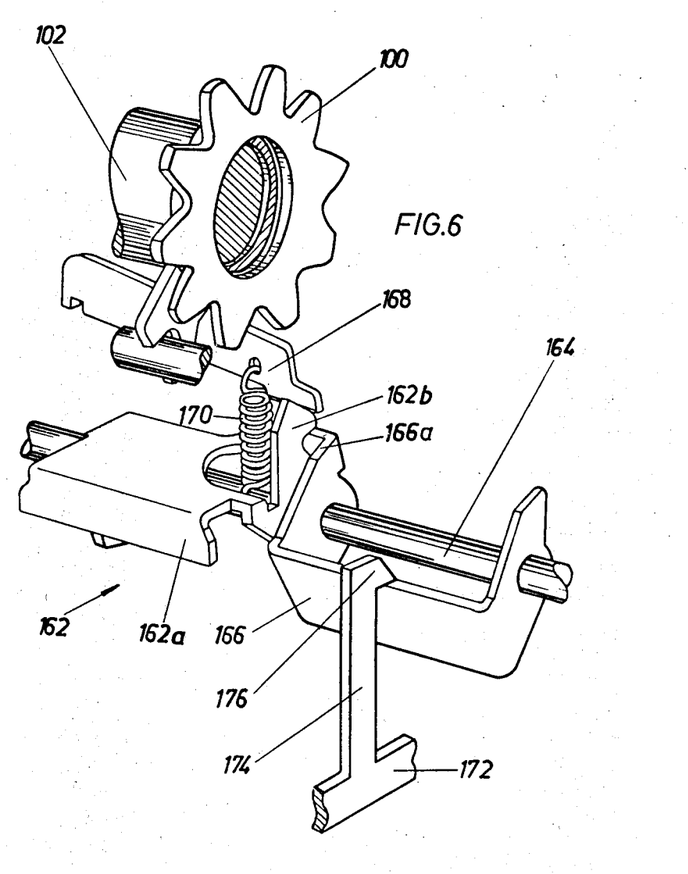
FIGS. 6 and 7 are perspective views of the tens transfer mechanisms for the counter register for consecutive number in normal and activated position.
Figure 7:
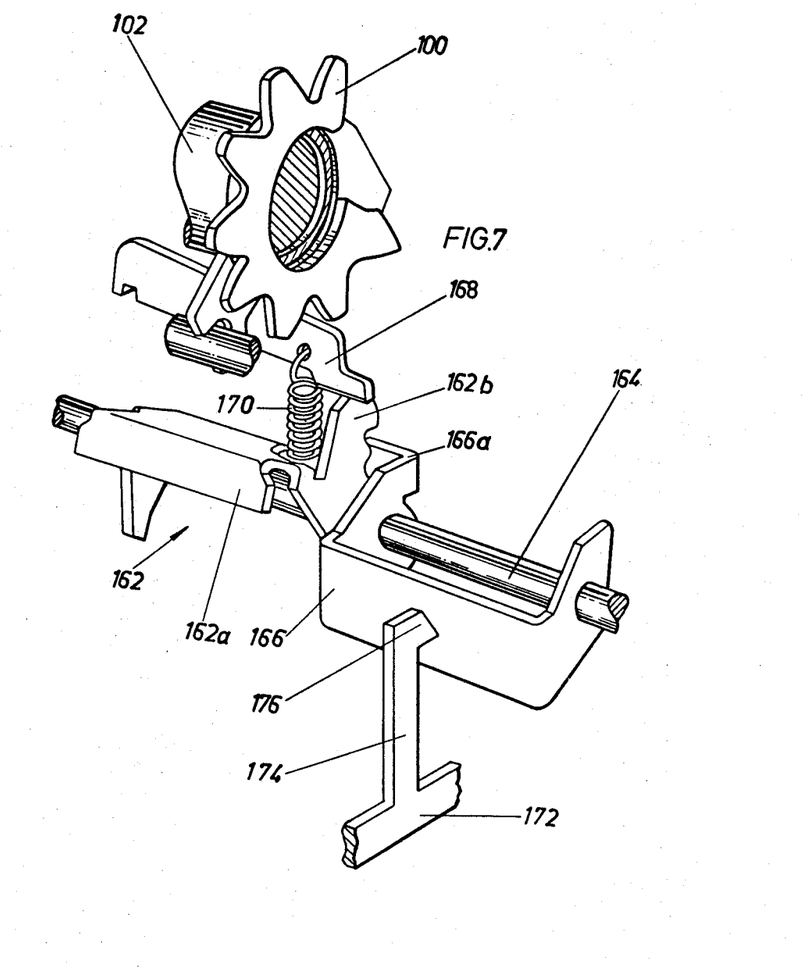

The brackets 162a are settable from the normal clockwise position of FIGS. 3 and 6 to the operative counterclockwise position of FIG. 7. The brackets 162a are each yieldably held in set position by an arm 168, urged by a spring 170 into engagement with one or the other inclined edges at the upper end of an upstanding arm 162b of the bracket. The shaft 164, with the brackets 162a, is raised and lowered as a unit together with the register gears 100a and 100b for engagement with and disengagement from the racks 106 of the gears 100a. When a rack 106 rotates a gear 100 from "9" to "0," means is operative to rock the bracket 162 of the next higher order counterclockwise to the position of FIG. 7. When the gears 100 and the brackets 162a have been lowered, means is operative to register a tens transfer unit in the gears 100 having the related brackets 162a in counterclockwise position. If a gear 100, receiving a transfer unit, contains "9," the passage of the gear to "0" will rock the next higher order bracket and this will be followed by a transfer operation in that order, etc. When the tens transfer operations have been completed, means is operative to restore all operated brackets 162a to normal clockwise position.

The bracket 166 in the intermediate order has a leftward extending coupling lug 166a, which engages a recess in the arm 162b in the lowest order bracket 162a. Accordingly, if the bracket 166 is rocked counterclockwise it will rock the fitted bracket 162a in like direction to operative position. Furthermore, bracket 166 will be restored when fitted operated bracket 162a is restored. The control means for the brackets will be described in the following section.

The means for controlling the bracket 166 comprises a slide 172 which has suitable slot and pin mounting for movement front and rear in the machine as shown in FIG. 3. Slide 172 includes an upstanding arm 174 for the bracket 166 which is provided between the register gears 100a and 100b. The arm 174 includes a rearwardly extending hook end 176 in its upper part. When the slide 172 is in its right adjusted effective position the hook end 176 will be located immediately above the front edge of the bracket 166. When slide 172 is in its left position, the hook 176 will be in front of the bracket 166 and out of its path of movement when the register units 100a, 100b are moved towards the racks 106.

Means for adjusting the slide 172 includes a vertically disposed crank shaft 178 (FIGS. 3, 4) fulcrumed in suitable bearings 180. The lower end of the crank shaft 178 is bent to form a leftwardly extending crank arm 182, extending through an opening in the left end of slide 172. The upper end of the crank shaft 178 is also bent to form a forwardly extending crank arm 182a having its end bent upwardly through an opening in a slide 184, which extends transversely across the front of the machine immediately below the racks 106. The slide 184 has slot and pin mounting for longitudinal adjustment.

Figure 4:
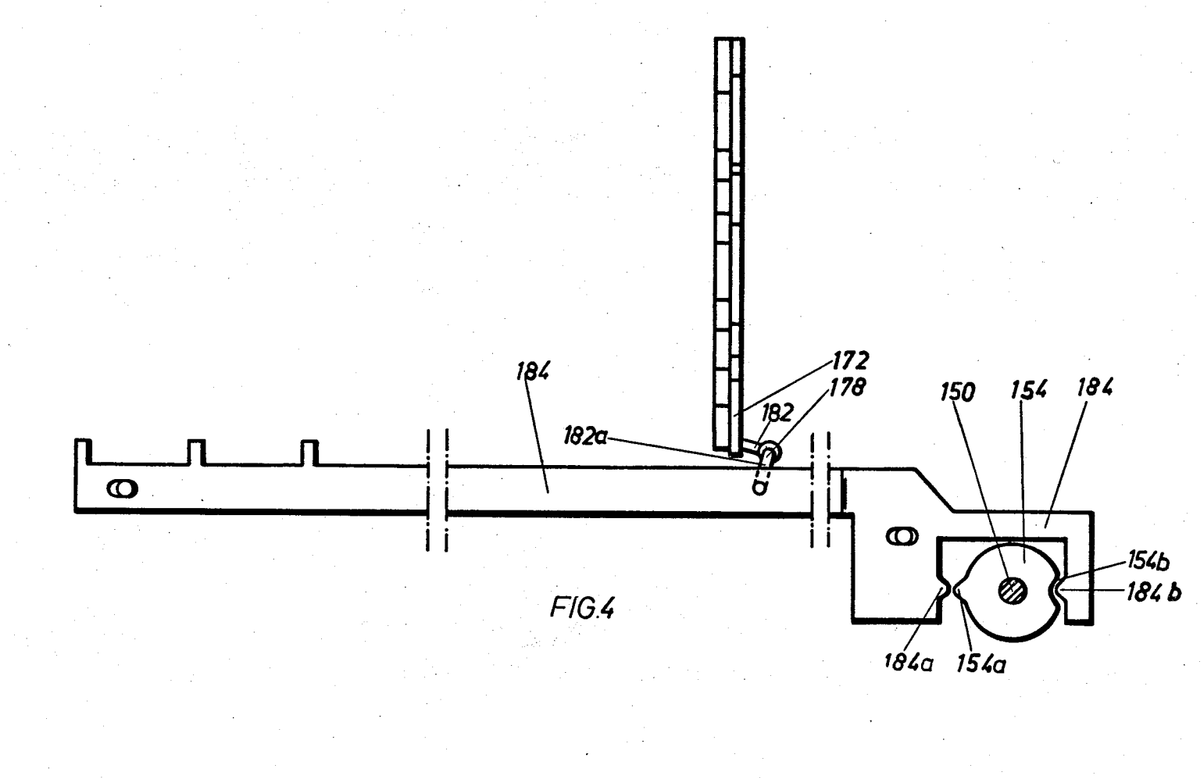
FIG. 4 is a top plan view of means that are controlled by the mode of operation of FIG. 2.

The means for adjusting slide 184 includes the aforenoted cam disc 154 which is adjusted by the slide 146. The slide 184 is recessed at its right end to contain the cam disc 154. The cam disc 154 includes a lobe 154a and an opposed recess 154b. When the cam disc 154 is in the position of FIG. 4, the lobe 154a engages a lobe 184a of the slide 184, and the recess 154b is engaged by another lobe 184b of the slide. Accordingly, slide 184 is held in the left adjusted position as shown in FIG. 4.

When the slide 184 is in its left adjusted position, the crank shaft 178 will be rotated clockwise (FIG. 4), and the slide 172 will be in the position of FIG. 3, wherein the hook 176 is above the front edge of the bracket 166. When the cam disc 154 is rotated to disengage lobe 154a from lobe 184a and recess 154b from lobe 184b, slide 184 will be moved a step to the right from the position of FIG. 4. Furthermore, the crank shaft 178 will be rotated counterclockwise to move slide 172 forwardly, thereby moving the hook 176 from above the front edge of the bracket 166.

With reference to FIG. 3, the machine is provided with five register shafts, each one supporting an assembly of register gears. In each order for each register shaft is a tens transfer unit 162 provided. In FIG. 3 only one of these units 162 is shown. For clarity, the other tens transfer mechanisms have been omitted from FIG. 3. The register shaft 102 which is positioned to the right in FIG. 3 supports the above mentioned register gears 100a and 100b. The bracket 166 is therefore provided only in one order in the whole machine as shown in FIG. 5. On the keyboard of the machine are keys (not shown) selecting the register gears which are to be lifted and lowered into and out of engagement with the actuator racks 106 at a certain point of time. These devices are well known and there is no need for a description of them.

If the key 144 is depressed (which is performed when the audit strip is used up), which can be done if it is not blocked by means, which means is going to be described later, this depressing will initiate a machine cycle. During this cycle, before the differential means 110, 106, 108 in FIG. 3 have begun to move, the racks and slides 146, 110a, 106a, 108a in the mode of operation bank (FIG. 2) will move in correspondence with the depressed key 144. The mode of operation rack 146 is then moved and by means of the apertures 146a, the gear 148, the shaft 150, the cam disc 154, the slide 184 and the crank shaft 178, it moves the slide 172 to the position shown in FIG. 3, i.e. where the hook 176 is located above the bracket 166 in its path of movement. The mode of operation rack 146 also selects a reading-operation whereby the register gears are lifted into engagement with the racks 106 before the differential means 110, 106, 108 (FIG. 3) have received any movement. When the gears 100a and 100b are lifted into engagement with the racks 106 the bracket 166 will follow the lifting movement of the register gears 100a, 100b and the bracket 166 is rocked counterclockwise by the hook 176 on the slide 172. The register gears 100a, 100b are not lowered until they have been zeroized and again received the amount they had before they were lifted into engagement with the racks 106. Thus, the pre-programmed register 100a as well as the counter register 100b have been read.

The amount that the register gears contained when the key 144 was depressed has been received by the indicating racks during the operating cycle and transferred to the type wheels by way of the gears 112, 114 and the shaft 116. The type wheels will print the amount on the audit strip during the operating cycle.

Directly before the differential means in FIG. 3 was restored, and the registers 100a, 100b received the amount that was previously removed from the registers 100a, 100b another register, the itemizing totalizer 186, was lifted into engagement with the same differential means 110, 106, 108 in FIG. 3, and therefore the itemizing totalizer 186 received the same amount as the amount that was again received by the registers 100a, 100b. When the itemizing totalizer 186 and the registers 100a, 100b have been lowered against the tens transfer mechanisms 162 and a transfer of a unit has been performed in the counter register 100b, the cycle of operation is finished.

If the key 142—which is a total key—is depressed (that must be done when the audit strip is to be replaced in the cash register) which can be performed if it is not blocked by means, described later, this depression will initiate a cycle of operation, and the mode of operation rack affects means (not shown) which lift the itemizing totalizer 186 into engagement with the racks 106 for zeroizing. Now the new audit strip will, on its forward part, receive the amount of the itemizing totalizer as this amount is received by the type wheel 118, and printing is performed. This amount is, as mentioned above, identical, with the amount which was printed on the end of the preceding audit strip.

When the new audit strip has been used up the same procedure will be repeated again, by depression of the key 144. As aforenoted a transfer of a unit to the counter register 100b was performed when the counter register 100b together with the pre-programmed register 100a was lowered to the tens transfer mechanism 162, after that the key 144 was depressed. Therefore, when the registers 100a and 100b are now read, a number will be transferred to the type wheels and then printed on the audit strip. This number is the identity number of the machine. A consecutive number, one unit larger than the consecutive number that was printed on the beginning of this audit strip is also printed on the end of it.

The audit strip printer is well known and will therefore be described only where it has connection with the present invention.

An audit strip roll 200 (FIG. 8) is rotably provided on a fixed shaft 202. The audit strip which is composed of a paper strip 200a extends over a roll 204, passes between the print hammer 206, the ink ribbon 208 and the type wheels, only one 118 being shown in FIG. 8, in front of the steering plate 210 and over the rubber cylinder 212 and tightly squeezed on an audit strip spool 216 by a clevis 214. After the information of the type wheels 118 has been printed on the audit strip 200a by the print hammer 206, the spool 216 is rotated and pulls the audit strip 200a one step forward whereby the audit strip will be ready to receive the next printing.

To guarantee that no information will be lost, every audit strip 200a has its own consecutive number. This number is automatically printed, together with the identity number of the cash register, on the audit strip 200a in the special operation that has been described above.

It must therefore not be possible to take the audit strip 200a out of the cash register before these pieces of information have been printed.

Figure 9:
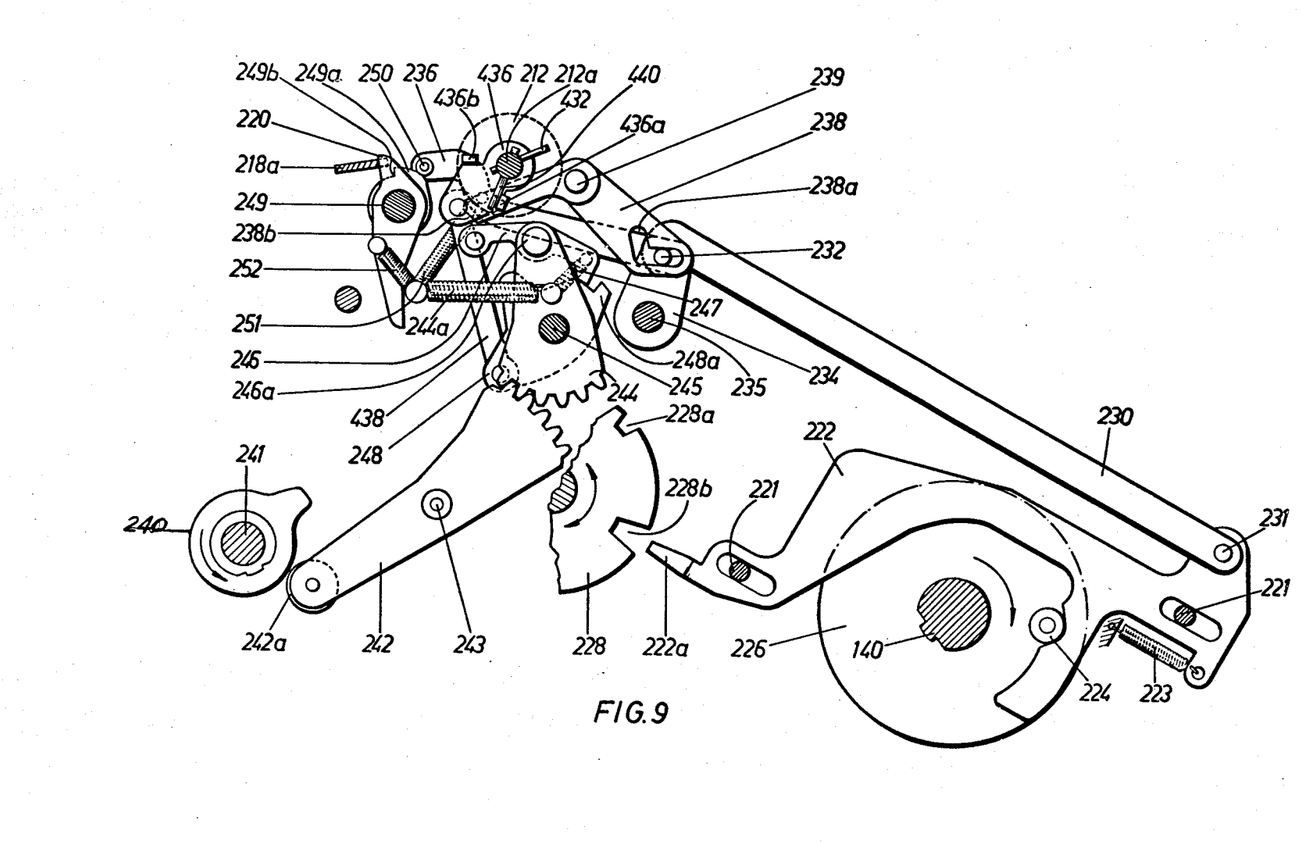
FIG. 9 is a view from the same side as FIG. 8, but with the cover and the audit strip removed, and showing the locking device according to FIG. 8, and other devices, to permit or prevent, respectively, the cash register from being started in certain modes of operation.

The audit strip mechanism is protected by a casing 218 which has been pushed on from the side and which is retained by a locking arm 220 being controlled by the mode of operation. It is possible to remove the casing 218 and change the audit strip 200a only in the rest position that follows after the operation that printed the consecutive number and the identity number of the machine. It is only in this position, the locking arm 220 will be in its opened, clockwise position. In FIGS. 8 and 9, the locking arm is shown in its locking, counterclockwise position.

The locking arm 220 receives its movement in the following way:

A test slide 222 (FIG. 9) is movably mounted on taps 221 in the printer frame plate, and is pulled to the left by a spring 223. The movement and the positions of the test slide is determined partly by a roller 224 mounted on a circular disc 226 on the drive main shaft 140 of the machine, and partly by a test cam 228 controlled by the mode of operation. When the drive main shaft is rotating, the roller 224 will first receive a short movement to the right for the purpose of locking the casing 218. This function will be described later. Thereafter, the roller 224 will leave the curved part of the test slide 222. The test slide 222 is now pulled to the left by the spring 223 and its finger 222a will test on the test cam 228.

In its different positions of the mode of operation the test cam 228 has either whole periphery, a small recess 228a or a deeper recess 228b. When the finger of the test slide 222a stops against a whole periphery, the test slide 222 has received a very short movement. Also a link 230 that bears on the test slide 222 by a tap 231 receives a short movement to the left. The other end of the link 230 bears on the tap 232, which is riveted on the arm 234, pivotally mounted on the stationary shaft 235.

The tap 232 is also a holder for a locking arm link 236 and a disconnection arm 238. The locking arm link 236 can affect the locking arm 220, and the disconnection arm 238, pivotally mounted on a shaft 239, can turn off the audit strip printer, but since the test slide 222, in this example, received only a short movement to the left, neither of these means will be affected. Thus, the locking arm keeps the casing in a locked position and the audit strip will be printed.

This is the positon of the printer when the information that has been indexed by the keys on the keyboard 12 is to be printed on the audit strip 200a.

A hammer disc 240 is rotating counterclockwise on a shaft 241 and affects, by means of the roller 242a, a segment 242 pivotally mounted on a fixed shaft 243 to pivot counterclockwise. A driving arm 244, rotatably mounted on a shaft 245 and pulled counterclockwise by the spring 244a, is then rotated clockwise. The coupling arm 246 of the driving arm 244 which is rotatably mounted on the arm 224 by means of a tap 246a and pulled clockwise in FIG. 9, affects projection 248a of a hammer arm 248 to rotate clockwise. The hammer arm 248 is fixedly mounted on the shaft 245. The hammer arm 248 presses the audit strip hammer 206 against the type wheels 118 by means (not shown). As the audit strip 200a and the ink ribbon 208 are positioned between the hammer 206 and the type wheels 118, the information of the type wheels 118 will be transferred to the audit strip 200a.

When the finger 222a of the test slide 222 can move into a small recess 228a in the test cam 228, the link 230 will receive a somewhat longer movement to the left than in the previous example. The tap 232 is now moving to the left, and the disconnection arm 238—due to its angleformed slot 238a—is rotating counterclockwise and the back edge 238b of the disconnection arm 238 is affecting a tap 246b on the coupling arm 246 to rotate counterclockwise. When the hammer disc 240, in the same way as in the preceding example, affects the segment 242 to rotate the driving arm 244, the coupling arm 246 will pass above the projection 248a of the hammer arm 248 and the audit strip will not be printed (not shown). The locking device of the casing 218 of the audit strip is not influenced this time either.

When the audit strip 200a is to be exchanged and the special key 144 therefore is depressed, the test cam 228 will take up the position shown in FIG. 9. The finger 222a of the test slide 222 moves into the deep recess 228b, and the link 230 now receives such a long movement to the left that the tap 232 is moved to the left part of the angle-formed slot 238a in the disconnection arm 238. The disconnection arm 238 will therefore turn at first counterclockwise and thereafter clockwise back to the base position. The function of the coupling arm 246 will now be the same as in the first example, i.e. when the driving arm 244 is rotated clockwise, the coupling arm 246 will receive such a movement that it will be in close contact with the projection 248a of the hammer arm 248, and therefore the hammer arm will turn clockwise to make a printing of a consecutive number and an identity number on the audit strip 200a.

When the tap 232 moved to the left in FIG. 9, the link of the locking arm 236 was also moved to the left. The locking arm 220 is welded to a hub 249, which is provided with a cam 249a on the opposite end (also see FIG. 11). The link 236 of the locking arm has a tap 250 which is pulled against the curve 249a by a tension spring 251. When the link 236 of the locking arm is moved to the left, the tap 250 will fall down behind the recess 249b in the cam 249a. When the roller 224 on the disc 226 of the main drive shaft 140 restores the test slide 222, the link 230 and the link 236 of the locking arm 236 will be pulled to the right, and the tap 250 affects the locking arm 220 to turn clockwise. The casing 218 of the audit strip can now be removed and the audit strip 220a will be accessible for replacement.

Figure 2:
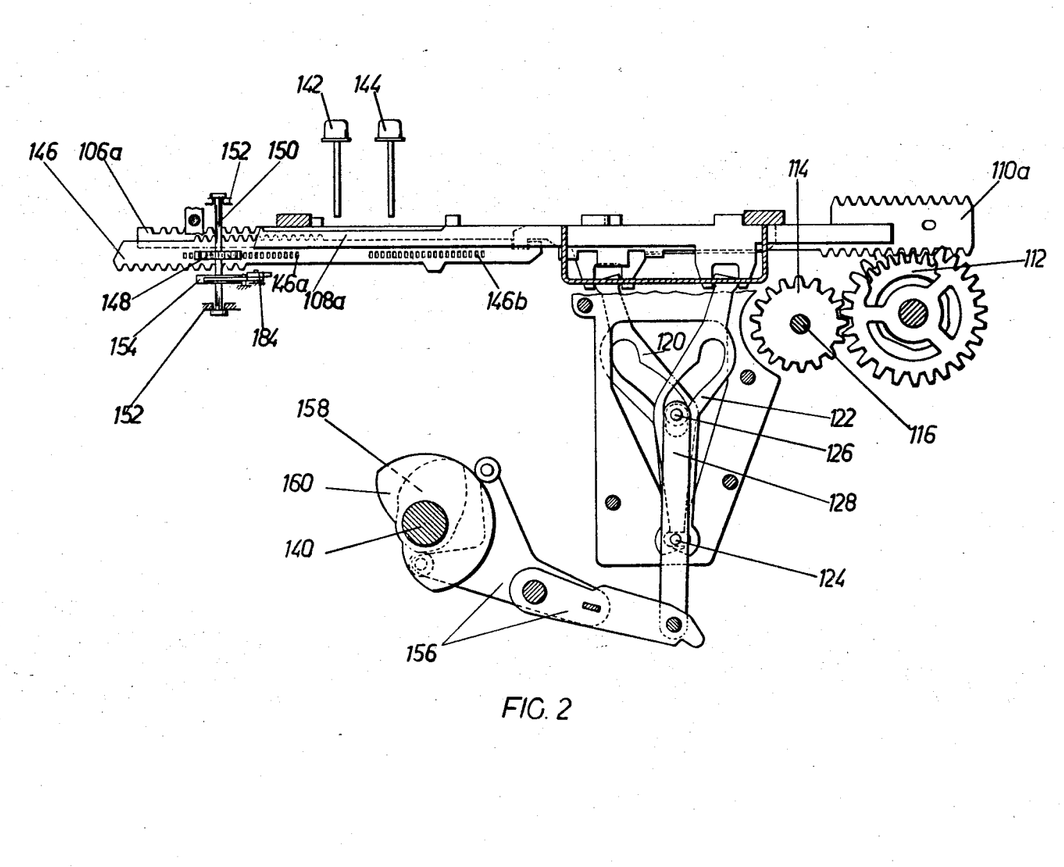
FIG. 2 is a side elevational view of the rack assembly of the operation bank in a cash register, the said rack assembly being controlled by schematically shown keys, that select the mode of operation.

After a new audit strip has been installed the cash register is started with the normal total key 142 (FIGS. 1 and 2). As soon as the main drive shaft 140 has begun rotating, the test slide 222 will be forced somewhat to the right by the roller 224. Consequently, the link 230 and the link of the locking arm 236 also move to the right. The tap 250, that previously held the locking arm 220 in an open position, is now pulled up on the high part of the cam 249a and the locking arm 220 is rotated counterclockwise, pulled by the spring 252. The casing 218 of the audit strip 200a is now locked again.

During the present cycle of operation, the consecutive number and the identity number will be printed also on the new audit strip as first information. When this audit strip is consumed and the special key 144 is depressed, to make it possible to exchange the audit strip, the identity number and the consecutive number will be printed as last information etc., according to the aforenoted description.

For further improvement of the control that no registrations on the cash register will be lost, the previously described compulsorily printed audit strip numbers have been combined with a start blocking which will be operative when:

(a) The casing of the audit strip has been removed or it is erroneously applied (b) The audit strip is missing (c) The audit strip has been torn off (d) The audit strip is so close to its end that it has left its hub.

When one of the start releasing keys 400 in the transaction banks 18 is depressed (FIGS. 1 and 10) the corresponding start slide 402 is affected, due to the tongue 404 of the key stem and the inclined slots 406, to move forward. The front edge of the start slide now affects a start bridge 408 to turn clockwise around its shaft 410. The start bridge 408 in its turn will affect a starting arm 412 to turn counterclockwise around its shaft 413 and a locking arm 414 to turn clockwise around its shaft 415. The arm 412 is pulled clockwise in its back edge by a spring 411. During the latter part of the preceding cycle of operation, a starting cam 416 was restored to its counterclockwise base position and a roller 417 on the starting cam 416 was caught by the locking arm 414. The starting cam 416 that is supported by a shaft 416a, is provided with a gear 416b which meshes with the cogged rim 418 of a starting segment. The starting segment 418, rotatably mounted on a shaft 419, is in its upper (clockwise) position and the starting spring 420 is stretched. When a starting key 400 is depressed and the locking arm 414 turns clockwise, the starting cam 416 will be released and rotated clockwise by the starting spring 420 of the starting segment 418.

The rotating movement of the starting cam 416 has been utilized, not only to close the circuit to the motor of the cash register and to release the cycle stop from the main shaft (not shown), but the first part of the rotating movement performs certain tests that decide if the rotating movement will be allowed to continue so that the cash register will start. It shall, for instance, be impossible to start the cash register when the cover 218 of the audit strip is not on place or when the audit strip 200a has not been fed forward after each pirnting operation.

Figure 10:
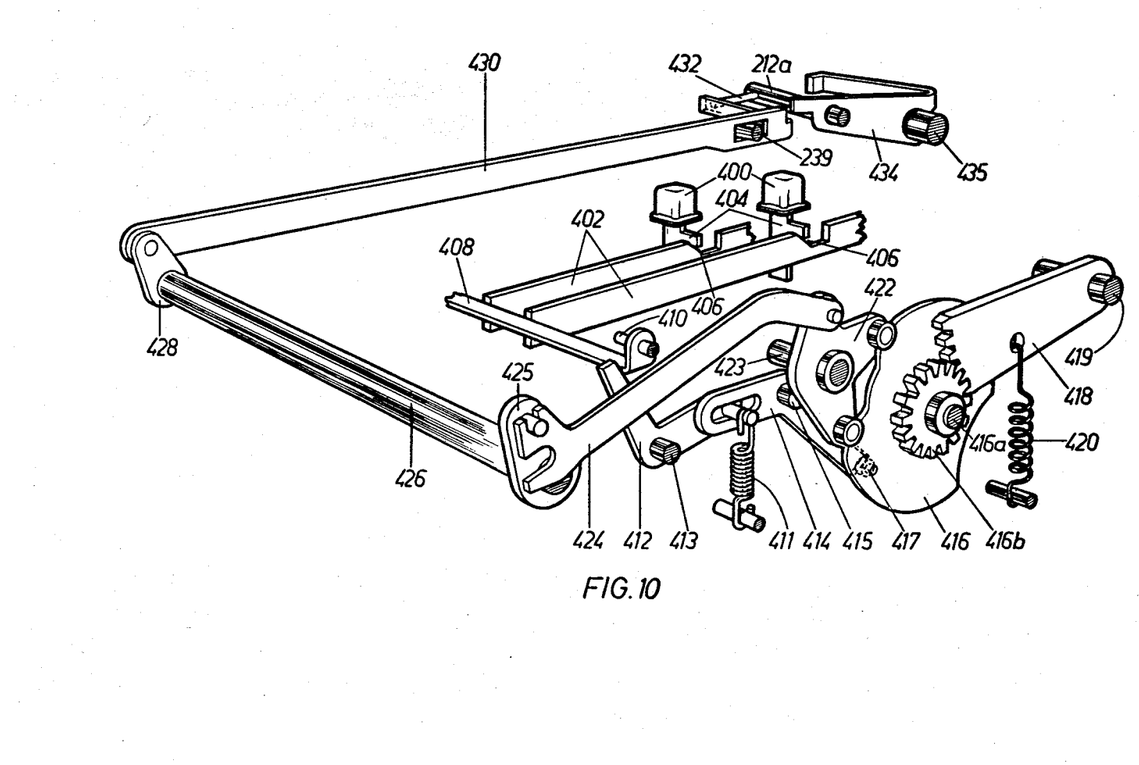
FIG. 10 is a perspective view of a device, to prevent start of the cash register, for example if the cover according to FIG. 8 has not been locked up on the cash register or if the audit strip has been torn off or if it has not been fed.

During the first part of the rotating movement of the starting cam, an arm 422 supported on a shaft 423 is affected to turn clockwise by the curve of the starting cam and a link 424 which is coupled to the arm 422 is moved backwards in FIG. 10. The link 424 that bears on the arm 422 is in engagement with an arm 425 on a shaft 426 which turns clockwise. On the other end of the shaft a similar arm 428 is provided to which the test slide 430 is coupled. The test slide 430 is moved backwards, where it tests partly on a blocking pin 432 on the shaft 212a, and partly on a blocking arm 434. If either of these last mentioned means prevent the test slide 430 from moving backwards the cash register will not start.

The blocking of the start by the blocking pin 432 is controlled in the following way (see FIG. 9 and 11).

At the same time as the hammer arm 248 is turning clockwise thereby causing print on the audit strip 200a, a driver 436 that bears on the shaft 212a will rotate the arm clockwise by means of an intermediate link 438. A second pin 440 on the shaft 212a is positioned between two bended tongues 436a and 436b on the driver 436. When the driver 436 rotates clockwise, the tongue 436a will make contact with the pin 440 with the consequence that the shaft 212a is forced to rotate clockwise. As the roll 212 is rigidly fastened to the shaft 212a, the shaft 212a will also rotate clockwise. Thereafter the driver 436 will be restored to its counterclockwise base position, influenced by the link 438, the hammer arm 248 and a spring means (not shown).

Feeding of the audit strip will now follow (function not shown). As the audit strip 200a is tightly stretched over the roll 212 (FIG. 8) the friction between the roll and the paper will cause the roll to rotate counterclockwise by the audit strip. Consequently, the locking pin 432 will take up such a position that it cannot prevent the movement of the test slide 430 to the right in FIG. 10, upwards in FIG. 11.

If he audit strip 200a at the time of the feeding movement has been torn off or arrived so close to its end that it has come loose from its hub on the shaft 202 (FIG. 8), there will be no friction between the audit strip 200a and the roll 212. Consequently, the audit strip is incapable of rotating the roll 212 anymore and therefore the locking pin will remain in its clockwise position where it prevents the test slide from being moved to the right in FIG. 10. Due to this, the cash register cannot be started.

The operator must now search for the reason for the start failure. In case the audit strip 200a has been torn off or is almost used up, the changing of the audit strip roll must be prepared, at first by finalizing the present transaction and then providing the audit strip 200a with a consecutive number and an identity number.

Thus, to make the machine start, the roll 212 must be rotated counterclockwise so that the blocking pin 432 will be moved out of the path of movement of the test slide 430. This will be performed by manually turning a grooved ring 212b which is positioned on the roller 212. The ring 212b is accessible for the operator although the casing of the audit strip 218 is in its installed, locked position.

The part of the startblocking mechanism being controlled by the locking arm 434 in FIGS. 10 and 11 functions in the following way.

The locking arm 434 is pivotally mounted on a shaft 435 as well as on the shaft 212a. A compression spring 442 on the shaft 212a presses the locking arm 434 against the right printer frameplate 444. In this position the front edge 434a of the locking arm 434 will be aligned with the back edge 430a of the test slide 430 and prevents the backward movement of the test slide. Therefore, the cash register cannot be started.

Figure 11:
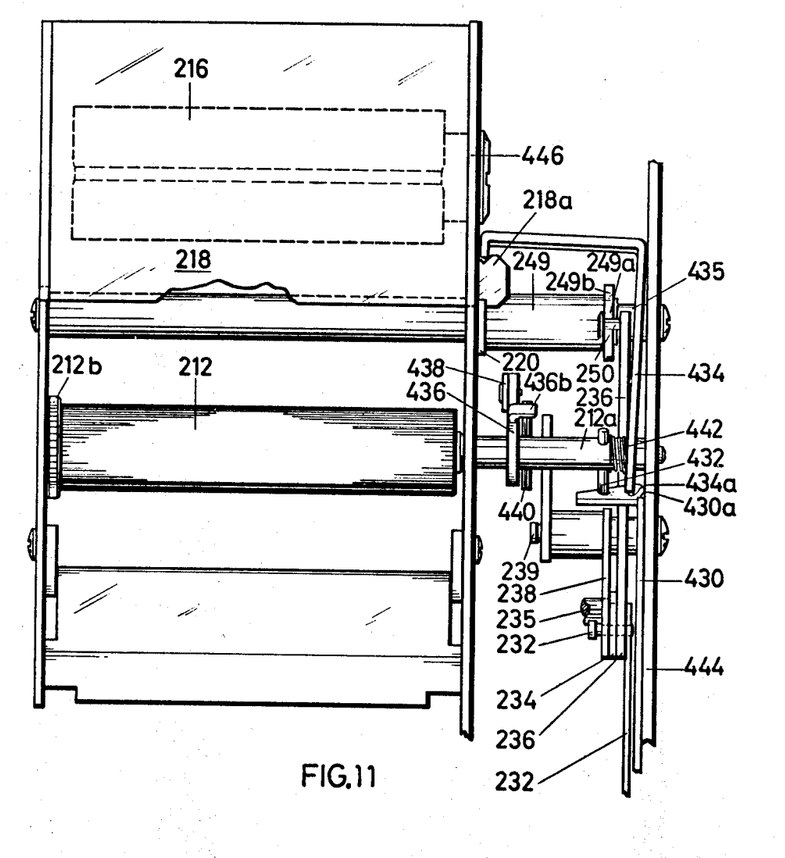
FIG. 11 is a top view of some of the devices according to FIGS. 8, 9 and 10.

This is the position the locking arm 434 will receive when the casing 218 of the audit strip in FIGS. 8 and 11 has been removed in conjunction with the replacement of the audit strip. This start blocking will be overcome as soon as the casing 218 has been restored. A projection 218a on the casing 218 is pushed through a slot in the left printer frame plate 446. The projection 218a has such a shape that it affects the locking arm 434 to turn counterclockwise in FIG. 11. The compression spring 442 will be compressed and the front edge 434a of the locking arm 434 will move out from its earlier position against the frame plate 444. It is now possible for the test slide to move backward whereby the cash register will start.

Although, in the description and in the drawings only one embodiment of the present invention has been described, it will occur to those skilled in the art that the invention is intended to cover such modifications that fall within the scope of the invention. The invention is thus intended to be limited in scope only by the appended claims.

What is claimed is:

1. A device adapted to register information on a data record in an office machine comprising:
   amount registering means;
   a first register adapted to store information entered by said amount registering means;
   a second register adapted to store information;
   a blocking means for controlling access to a data record;
   locking means adapted to control said blocking means;
   transfer means for transferring information stored in said second register to the data record;
   first operation selection means which is adapted to control actuation of the transfer means and to control said locking means to actuate said blocking means to permit access to the data record, and
   a second operation selection means which is adapted to control the transfer means and to control the locking means to actuate the blocking means and prevent access to the data record.

2. The device of claim 1 wherein said second register includes a preprogrammed register being adapted to store information representing indicia indicative of said machine and wherein said second register includes a register for storing information representing a series of consecutive indicia each of which is applicable to a particular data record.

3. The device of claim 2 wherein said first operation selection means is adaptable to activate a control device which affects a tens transfer means associated with the lowest order of said second register for transferring consecutive indicia from the register to the data record in a machine cycle, and wherein the indicia is one unit larger than the indicia that was registered on the data record in a previous machine cycle.

4. The device of claim 3 wherein a data record is provided which consists of a paper audit strip and wherein information is stored in the second register due to actuation of the first operation selection means which information is printed at one end of the audit strip and wherein by actuation of the second operation selection means the same information is printed at the beginning of said audit strip.

5. The device of claim 4 wherein the blocking means consists of a casing which encloses winding devices for the paper audit strip and which is locked by the locking means for all operations except the operation in which the information stored in the second register is registered on the paper audit strip by the first operation selection means.

6. The device of claim 5 wherein the locking means includes a disc which has at least one recess and which is set in accordance with a machine function and wherein a testing device is provided and wherein further when this recess is set in line with the testing device, the locking means will release the blocking means to provide access to the data record.

7. The device of claim 6 wherein a first stopping device prevents operation starting means on the keyboard from being activated when the blocking means in in a position wherein the audit strip is accessible.

8. The device of claim 7 wherein a second stopping device prevents the operation starting means from being activated when the audit strip is absent.

9. The device of claim 8 wherein a second stopping device is provided which includes a roll which is frictionally rotated by the audit strip.

10. The device of claim 9 wherein restoring means are provided to restore the second stopping device to a stopping position beforethe paper audit strip is fed.

11. The device of claim 10 wherein the first and second stopping devices are sensed by a common sensing device.

References Cited

UNITED STATES PATENTS

| | | | |
|---|---|---|---|
| 2,636,435 | 4/1953 | Goodbar et al. | 101—93 |
| 2,746,382 | 5/1956 | Hanson | 101—91 |
| 3,186,635 | 6/1965 | Schultz | 235—1 |

STEPHEN J. TOMSKY, Primary Examiner

U.S. Cl. X.R.

235—1, 130